United States Patent [19]
Land et al.

[11] 3,810,201
[45] May 7, 1974

[54] AUTOMATIC RETURN MECHANISM FOR MANUALLY ADJUSTABLE TRIM ASSEMBLY

[75] Inventors: Edwin H. Land, Cambridge; Lawrence M. Douglas, South Easton, both of Mass.

[73] Assignee: Polaroid Corporation, Cambridge, Mass.

[22] Filed: Apr. 24, 1972

[21] Appl. No.: 246,851

Related U.S. Application Data
[63] Continuation-in-part of Ser. No. 168,672, Aug. 3, 1971, abandoned.

[52] U.S. Cl. .................... 95/10 C, 95/11 R, 95/39
[51] Int. Cl.. G03b 19/02, G03b 17/04, G03b 17/18
[58] Field of Search ........... 95/11 R, 11 B, 10 C, 39

[56] References Cited
FOREIGN PATENTS OR APPLICATIONS
917,907   2/1963   Great Britain Primary Examiner—Samuel S. Matthews
Assistant Examiner—Kenneth C. Hutchinson

[57] ABSTRACT

An automatic return mechanism for a manually adjustable trim assembly is provided for use in conjunction with a camera having an automatic exposure control system. In the preferred embodiment of the present invention, the camera is foldable and includes a number of housing members interconnected for mutual movement between an erected configuration and a folded configuration for convenient carrying and storage. The automatic return mechanism is disposed within one of the housing members and operates in response to return of the camera into its folded configuration.

38 Claims, 8 Drawing Figures

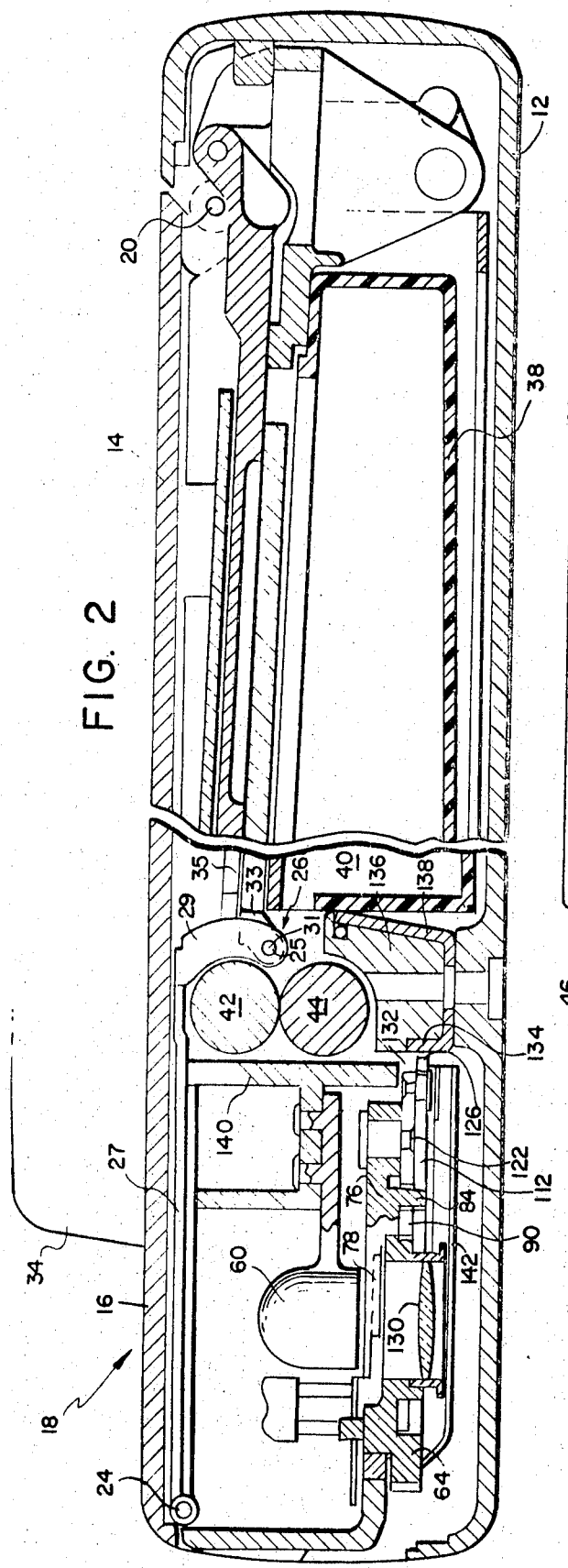

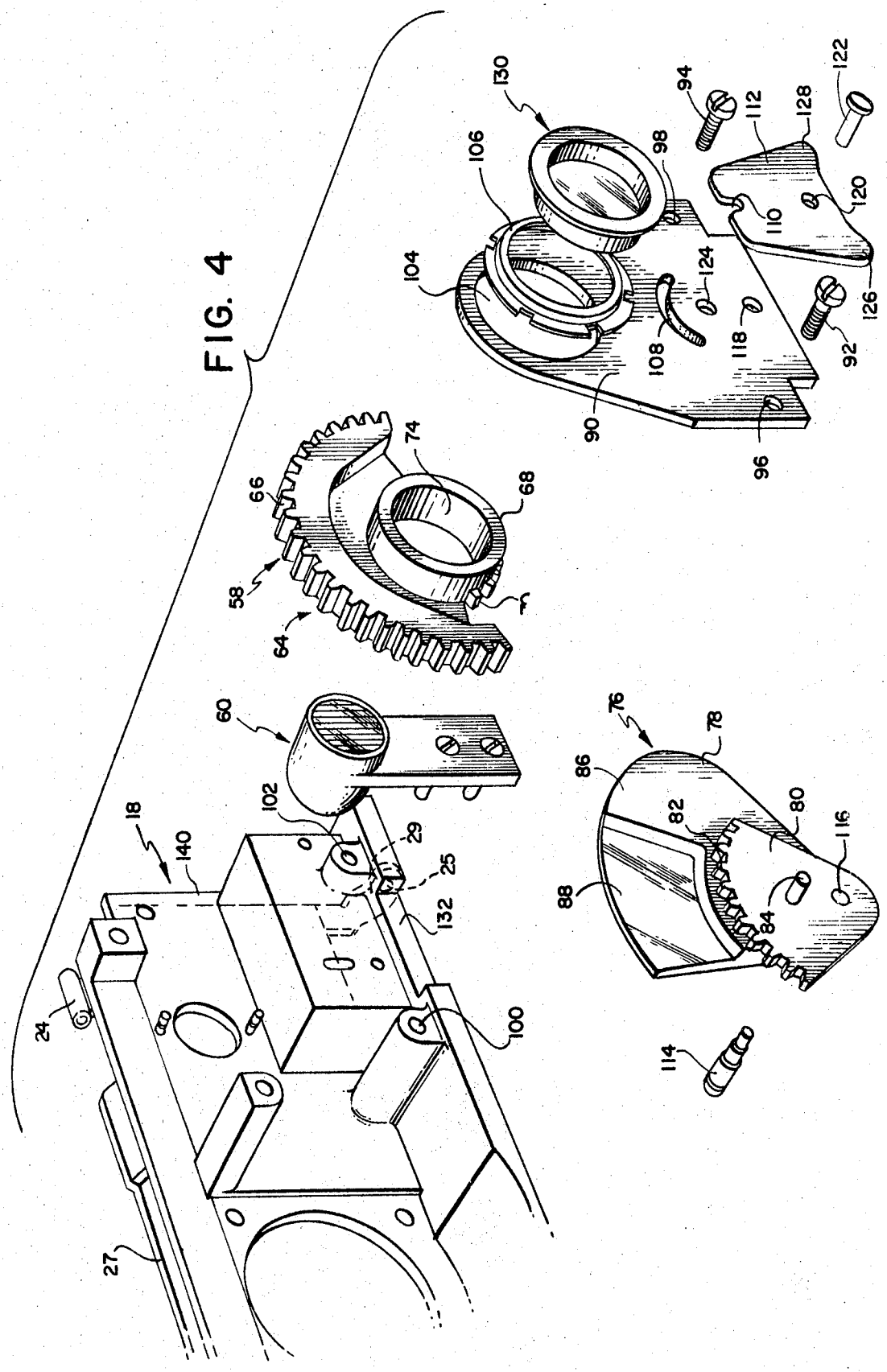

3,810,201

AUTOMATIC RETURN MECHANISM FOR MANUALLY ADJUSTABLE TRIM ASSEMBLY

This case is a continuation-in-part of Ser. No. 168,672 filed Aug. 3, 1971, now abandoned.

BACKGROUND OF THE INVENTION

Automatic exposure control systems have been incorporated within various amateur cameras for simplifying their operation by minimizing the pre-exposure adjustments to be made by a camera operator. These exposure control systems function to automatically regulate the exposure parameters for a given scene. Generally, the systems are designed for use over a range of scene lighting conditions representing those most frequently encountered in photo-graphic practice.

Since a large majority of amateur pictures are taken within the range of light levels to which the control system is suited, well-exposed photographs are obtained. However, the camera operator may wish to take a photograph which is lightened or darkened to his personal taste, or may wish to accommodate for unusual lighting effects such as backlighting, highlights or the like. In order to adjust an automatic control system for such unusual scenes or effects, a lighten-darken trim is provided. These trim systems provide the user with a manual one or two stop optional exposure adjustment above or below the exposure value otherwise established automatically.

One consequence of the presence of lighten-darken trim systems is that a camera operator often neglects to return the trim to a predetermined or normal position after an exposure is taken. As a result, when a next photograph is to be taken under more conventional lighting conditions requiring no trim, the photograph obtained is adversely affected by the previous setting.

SUMMARY OF THE INVENTION

The present invention is addressed to an automatic return mechanism for a manually adjustable trim assembly as provided in conjunction with a camera having an automatic exposure control system.

The invention preferably is employed in conjunction with a camera having a number of housing members interconnected for mutual movement between an erected configuration for forming an exposure chamber, and a folded configuration for convenient carrying and storage, and will be so described for convenience.

An exposure control housing, forming as one of the housing members, is pivotally coupled to the front of the camera. The exposure control housing contains the electronic components of the camera's automatic exposure control system for regulating the exposure of photosensitive material within the camera. Also included within the exposure control housing is a manual trim assembly, providing the camera user with about a two stop optional exposure adjustment above or below the exposure value established automatically.

The trim assembly is configured having a trim reset plate pivotally movable in response to the manual adjustment of the trim assembly away from its normal position. Adjustment of the trim assembly out of its predetermined (normal) position causes one corner of the reset plate to protrude below the bottom of the exposure control housing. When the camera is foldably collapsed, a tangential cooperation is established between that corner of the reset plate extending below the exposure control housing and one of the housing members. This engagement provides a force which is operative to rotate the reset plate to a position in which its extended corner is flush with the bottom of the exposure control housing. This latter position represents the normal position of the reset plate. Due to linkages within the trim assembly, return of the reset plate to its normal position results in a similar return of the trim assembly. Accordingly, the trim assembly is automatically returned to a normal position in response to the folding of the camera.

One feature and object of the present invention is to provide an automatic return mechanism for a manually adjustable trim assembly used in conjunction with a camera having an automatic exposure control system.

Another feature and object of the present invention is to provide a photographic apparatus including foldable housing members movable between erected and collapsed configurations; an exposure control system disposed within at least one of the housing members, the exposure control system includes a manually adjustable trim assembly movable from a predetermined position for regulating the responsiveness of the control system; and a trim reset mechanism which is operative to automatically return the trim assembly to its predetermined position in response to the movement of the housing members from their erected configuration to their folded configuration.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is a side elevational fregmantary view of the camera of FIG. 1;

FIG. 3 is a front elevational fragmentary view of portions of the camera of FIG. 1;

FIG. 4 is an exploded perspective view of the trim assembly of the camera of FIG. 1;

DETAILED DESCRIPTION OF THE INVENTION

Figure 1:
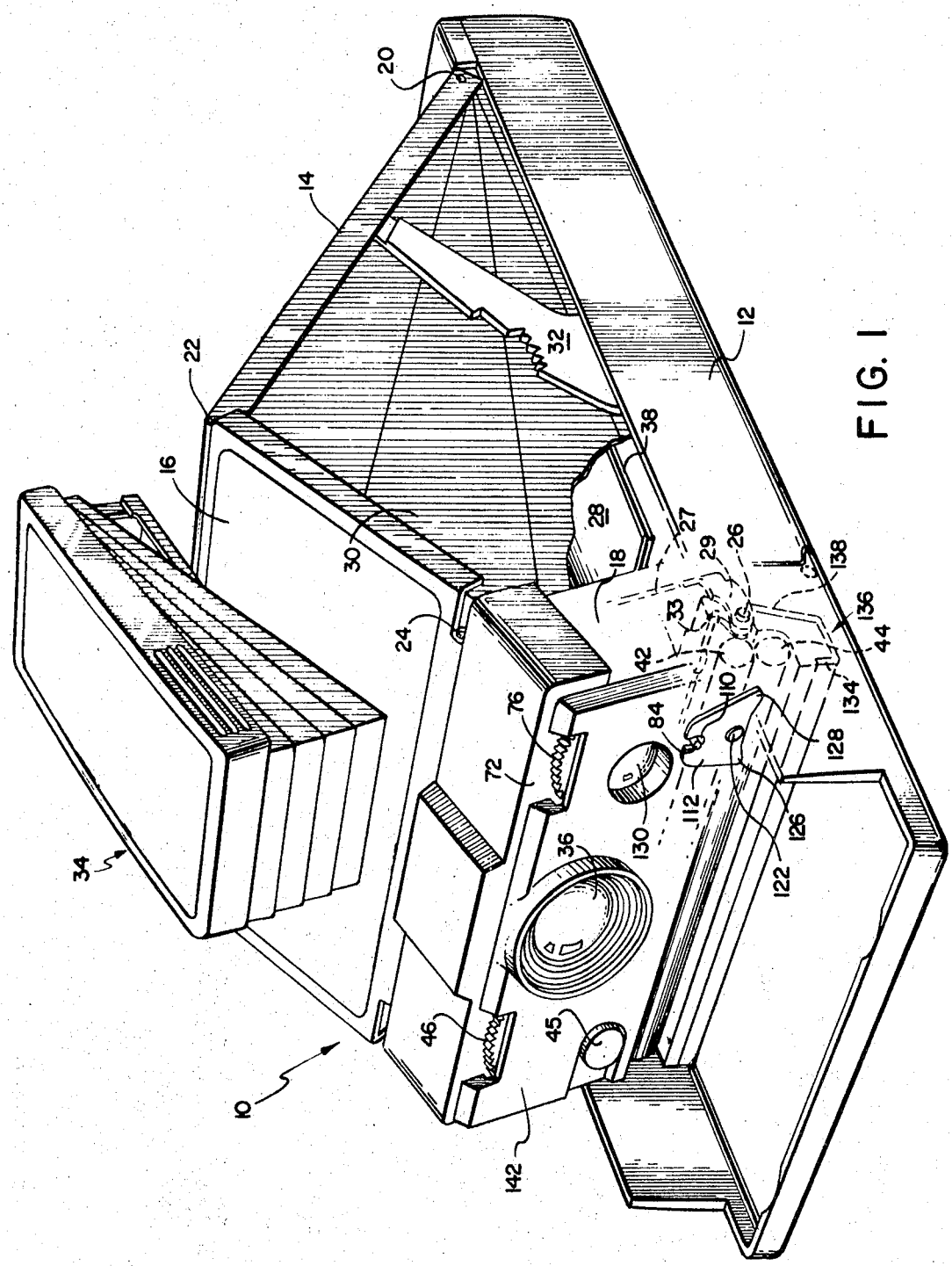
FIG. 1 is a pictorial representation of a single-lens reflex camera according to the invention shown in its erected shape with portions broken away to reveal internal structure.

Referring to FIG. 1, an automatic camera incorporating the features of the present invention is illustrated generally at 10. Camera 10 is shown in an erected configuration suited for exposing a photosensitive film unit contained therein. The camera 10 structure includes a bottom housing section 12, a rear housing section 14, a top housing section 16 and a front exposure control housing 18. Sections 12, 14, 16 and 18 are pivotally linked to each other about respective hinge axes 20, 22, 24, and 26 and are mutually movable between the erected configuration of FIG. 1 and the compact folded configuration shown in FIG. 2.

When erected, sections 12, 14, 16 and 18 cooperate to define four sides of a six-sided exposure chamber 28, the remaining sides of the chamber being enclosed by a flexible bellows 30 constructed of any suitable opaque material. Note that in the erected configuration, rear housing section 14 is supported by erecting linkages as at 32 in a position angularly extending from bottom section or base 12 at axis 20. As a result of this connection, top section 16 is angularly oriented between hinges 22 and 24 to form an upper surface of the exposure chamber.

Positioned upon top housing section 16 is a viewfinder apparatus shown generally at 34. View-finder 34 and its related internal components are described in detail in a copending application for Unites States Patent by James G. Baker, entitled "Reflex Camera and Viewing Device," Ser. No. 98,356, filed Dec. 15, 1970 and assigned in common herewith, now abandoned. Viewfinder 34 is constructed having mutually movable components which permit its erection (see FIG. 1) and its collapse (see FIG. 2).

When camera 10 is erected, exposure control housing 18 is withdrawn from its nested orientation within base 12 (see FIG. 2) and is moved so as to position an optical-taking lens assembly 36 for making an exposure. During its erection, exposure control housing 18 is rotated about axis 26, located along a forward portion of base 12. Pivotal support for housing 18 is provided by a hinge bracket 27 fixed to a rear casting 140 of housing 18. Hinge bracket 27 is configured having a generally C-shaped extension on each side of camera 10 as at 29 (see FIG. 2). Extension 29 is bored at its lower extremity as at 25. A pin 31 extends through bore 25 and into a second bore (not shown) formed within a bracket 33. Bracket 33 is fixedly attached to an inner frame member 35 positioned within camera 10.

Base 12 is configured at the bottom of exposure chamber 28 to receive and support a disposable film-retaining cassette structure, a portion of which is shown at 38 in FIG. 2. Cassette structure 38 is of a rectangular configuraton and retains a plurality of stacked film units, the uppermost one of which is positioned in coincidence with the exposure plane of camera 10. Formed on the forewardmost peripheral side of cassette 38 is an egress opening or slot 40 through which the uppermost film unit is removed for processing following its exposure.

Described in detail in a United States Patent by Edwin H. Land, U.S. Pat. No. 3,415,644, entitled "Novel Photographic Products and Processes," the film units contained within cassette 38 include all the materials necessary to produce positive photographic prints. A rupturable container of processing fluid (not shown) secured to the photosensitive composite is located in a position such that it may be easily withdrawn through slot 40. Upon exiting through slot 40, the uppermost film unit is engaged by a pair of pressure-applying rollers 42 and 44. Rollers 42 and 44 are supported for rotation by a supporting structure 136 (see FIG. 2), secured to base 12. Supporting structure 136 includes a U-shaped roller brakcet 138 to which rollers 42 and 44 are connected. Bracket 138 is configured having a lower portion 134, the function of which will be discussed below. Upon engaging the film unit, rollers 42 and 44 rupture the container of processing fluid and dispense the same along the photosensitive composite.

Exposure control housing 18, positioned at the front of camera 10, contains all the necessary components for controlling the exposure of photosensitive material. These components generally include a shutter assembly, a shutter release button 45, focusing mechanism, and a photosensing system for automatically determining the correct exposure for a given scene to be photographed.

Referring to FIGS. 2 and 3, there are shown several of the individual components contained within exposure control housing 18. Focusing is carried out by manual rotation of a geared focus wheel 46 located on one side of exposure control housing 18. A segment of focus wheel 46 extends through a slot in an upper portion of housing 18. Rotation of focus wheel 46 is translated to a peripheral gear structure 62 located on lens assembly 36 through an idler gear 48 interposed between the two (see FIG. 3). Focus wheel 46 is connected to a follow-focus system shown generally at 50 by mechanical linkages (not shown). Described and claimed in a copending application for United States Patent entitled "Apparatus and System for Flash Photography" by Lawrence M. Douglas, Ser. No. 168,671 filed Aug. 3, 1971, now abandoned and assigned in common herewith, follow-focus system 50 is operative to regulate aperture size in relation to subject distance when camera 10 is in a flash mode of operation.

Extending along the top portion of exposure control housing 18 is a trim link 52. Trim link 52 is connected to follow-focus system 50 through mechanical linkages shown generally as dashed line 54. Pivoted for rotation about a pin 56, trim link 52 establishes a connection between follow-focus system 50 and a trim assembly shown generally at 58.

Referring additionally to FIG. 4, the internal components of trim assembly 58 are revealed in more elaborate detail. Positioned on rear casting 140 of exposure control housing 18 is a photocell lens 60. Photocell lens 60 is a forward component of a photosensing system, the remaining components of which are not shown. Photocell lens 60 directs light from a scene into a photosensing system for regulating exposure in accordance with scene brightness levels. Positioned in front of photocell lens 60 are the individual components of trim assembly 58.

Manual adjustment of trim assembly 58 is carried out through the rotation of a trim wheel shown generally at 64. Wheel 64 is formed having a segmented gear portion 66, a hollowed cylindrical axial portion 68 and a lower geared portion 70. The uppermost part of segmented gear portion 66 extends through an opening 72 formed within rear casting 140 of exposure control housing 18. Trim wheel 64 may be rotated by the camera user by virtue of the extension of portion 66 through the top of housing 18. The inner diameter of hollowed portion 74 of cylindrical portion 68 is substantially equal to that of photocell lens 60. Accordingly, light from a scene is permitted to pass directly through trim wheel 64 and into photocell lens 60.

Positioned between lens 60 and trim wheel 64 is a trim wedge 76. Trim wedge 76 is formed having upper and lower portions 78 and 80, respectively. Lower portion 80 is formed having a geared portion 82 engageable with lower geared portion 70 of trim wheel 64. Upper portion 78 of trim wedge 76 is configured having two optically translucent portions 86 and 88. Translucent portions 86 and 88 are formed of a filtering material having selected different transmissibilities. These portions 86 and 88 are moved into and out of covering relationship with photocell lens 60 in response to the manual rotation of trim wheel 64. Additionally included on trim wedge 76 is a trim reset plate pin 84, the operation of which will be discussed below.

In a particularly useful embodiment, trim assembly 58 provides the camera user with a one-half stop darken to a one stop lighten trim. For instance, when photocell lens 60 is half covered by translucent portion 88 and half uncovered, trim assembly 58 is in a normal setting. When trim wedge 76 is rotated so that lens 60 is fully uncovered, trim assembly 58 is in a one-half stop darken setting. Likewise, full covering of lens 60 by portion 88 represents a one-half stop lighten setting and one-half covering by portion 88 and one-half covering by portion 86 represents a one stop lighten setting.

Trim wheel 64 and trim wedge 76 are pivotally supported by a mounting plate 90. Mounting plate 90 is secured to exposure control housing 18 by two bolts 92 and 94, extending, respectively, through holes 96 and 98. Bolts 92 and 94 engage threaded holes 100 and 102 formed within rear casting 140.

Located on the upper portion of mounting plate 90 is a trim wheel mounting hole 104. Hole 104 is configured as a bearing surface for supporting cylindrical portion 68 of trim wheel 64. Cylindrical portion 68 is retained within hole 104 by a ring 106 frictionally retained over the front of portion 68. Positioned in front of ring 106 is a glass lens and casing assembly 130. Assembly 130 is mounted through a front coverplate 142 (see FIG. 1) of exposure control housing 18 and provides a transparent protective seal for the components of trim assembly 58.

Mounting plate 90, secured to rear casting 140 of housing 18, is configured to pivotally support both trim wedge 76 on its rearward side and a trim reset plate 112 on its forward side. An arcuate slot 108, formed within mounting plate 90, is configured to receive trim reset plate pin 84 of trim wedge 76. Pin 84 extends through arcuate slot 108 and engages a slot 110 formed within trim reset plate 112. Pivotal support for trim wedge 76 is provided by a wedge pivot or stud 114, extending through a hole 116 formed with wedge 76 and supported from bore 124 formed within mounting plate 90. When wedge 76 is rotated about pivot 114, pin 84 moves along arcuate slot 108 causing rotation of trim reset plate 112 due to the connection between pin 84 and slot 110.

Trim reset plate 112, positioned forwardly of plate 90, is pivotally mounted to plate 90 by a pin 122. Pin 122 extends through a hole 120 formed within plate 112 and engages a bore 118 formed within mounting plate 90. As noted above, movement of pin 84 along arcuate slot 108 rotates reset plate 112 about pin 122 through slot 110. When in a normal position, reset plate 112 assumes a position best shown in FIG. 3, wherein slot 110 is vertically aligned. Additionally provided upon trim reset plate 112 are two teats 126 and 128. Teats 126 and 128 are formed on the lower left and lower right corners of plate 112, respectively, and extend through a slot 132 formed in the lower portion of rear casting 140 of housing 18 when reset plate 112 is rotated out of its normal position. The protrusion of either teat 126 or 128 through slot 132 provides for the return operation of trim assembly 58.

Should the camera user desire to adjust for trim, he merely rotates trim wheel 64 using segmented gear portion 66. Since a functional parity exists between both the lighten and darken operations of trim assembly 58, only one of the two will be discussed, i.e., the lighten operation. In order to provide for a lighten trim, the camera user rotates trim wheel 64 a select amount in a clockwise direction. Due to the geared connection between trim wheel 64 and trim wedge 76, clockwise rotation of the former results in a counterclockwise rotation of the latter. Accordingly, translucent portions 88 and 86 are selectively placed in front of photocell lens 60, and the camera's photosensing system operates in accordance with the "lower" light levels it "sees." Counterclockwise rotation of trim wedge 76 about pivot 114 results in similar movement of trim reset plate pin 84 along arcuate slot 108. Due to the engagement of pin 84 with slot 110, reset plate 112 is rotated in the counterclockwise manner about pin 122, thereby moving teat 126 out of its balanced position with teat 128 and through slot 132 of exposure control housing 18. The distance which teat 126 extends below the bottom face of rear casting 140 of housing 18 depends upon the amount which trim assembly 58 has been adjusted.

Trim assembly 58 will remain in this lighten position until the camera user returns it to its predetermined normal position. Since the camera user is often negligent in returning the trim assembly to this position, an automatic return feature is provided which becomes operative upon the folding of camera 10.

Referring to FIG. 1, as camera 10 is folded, exposure control housing 18 is pivoted counterclockwise about axis 26, thereby pivoting hinge bracket 27 and its extension 29 about pin 31. Counterclockwise rotation of housing 18 and hinge bracket 27 continues until protruding teat 126 engages lower portion 134 of support bracket 138. Upon contacting lower portion 134, teat 126 and reset plate 112 are rotated clockwise about pin 122 (see FIG. 3), due to forces derived from the folding of camera 10. As housing 18 is returned to its nested orientation within base 12, reset plate 112 is rotated to a position in which teat 126 is even with teat 128.

Thus maneuvered during the folding procedure, the trim assembly 58 is driven automatically to its predetermined normal orientation. In more detail, the return rotation of reset plate 112 causes a corresponding rotation of trim reset pin 84 and trim wedge 76 to their normal positions. Correspondingly, as trim wedge 76 is rotated clockwise, there is a resultant counterclockwise rotation to trim wheel 64, returning the latter to its predetermined normal position.

As may be evidenced from the foregoing, the preferred embodiment of the automatic return operation of trim assembly 58 depends upon the folding of exposure control housing 18 into its nested orientation. Should the camera user neglect to return the trim assembly to its normal position, the present invention will do so automatically when the camera is folded following its use.

Figure 5:
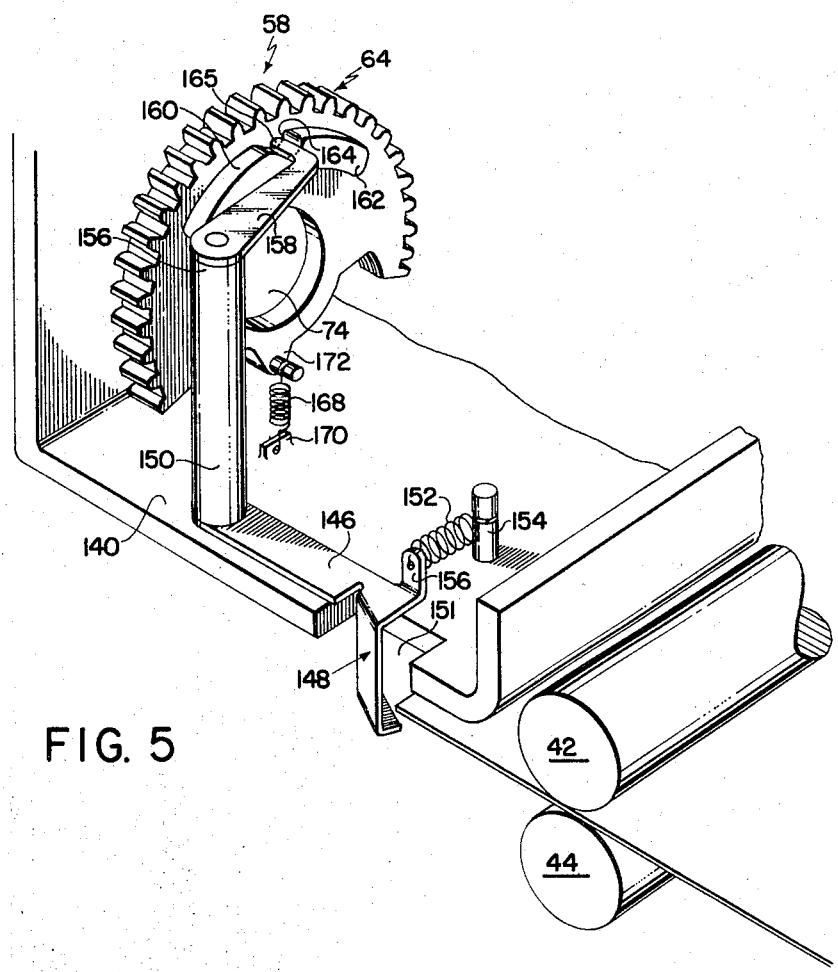
FIG. 5 is a perspective view of a second embodiment of the present invention.

Looking to FIG. 5, there is shown a second embodiment of the present invention. Positioned forwardly of processing rolls 42 and 44, and contained within exposure control housing 18, is a levered member 146. Levered member 146 is formed having a ramped structure 148 at one end. Ramped structure 148 extends below the bottom portion of exposure control housing 18 through a notch 151 and is partially within the exit path of the film unit as the latter passes through processing rollers 42 and 44. The opposite end of member 146 is fixedly attached to a rod 150 at its lower end. Rod 150 is in turn pivotally mounted to rear casing 140 by any suitable means, e.g., a pin. Configured as such, both rod 150 and levered member 146 are pivotable about the axis of rod 150. Connected to levered member 146 proximate to ramped structure 148 is a coil spring 152. One end of spring 152 is attached to a post 154 which is mounted to rear casing 140. The outer end of spring 152 is attached to levered member 146 through an extension 156. Spring 152 biases member 146 counterclockwise about rod 150 into notch 151.

Connected to the top 156 of rod 150 is one end of a leaf spring 158. The opposite end of spring 158 is selectively engageable with an arcuately shaped surface 160 formed as part of a cam member 162 positioned on the inward side of trim wheel 64. Cam member 162 contains a sloped notch 164 into which a portion 165 of spring 158 is seated when the trim mechanism 58 is in its normal position. A coil spring 168 is connected between an extension 170 of rear casing 140 and an extension 172 formed on the lower portion of trim wheel 64. Coil spring 168 is operative to bias trim wheel 64 into its normal position.

The return mechanism of the present embodiment functions in the following manner: Rotation of trim wheel 64 results in a similar rotation of cam member 160. Accordingly, portion 165 of spring 158 leaves the sloped notch 164 and rides along arcuate surface 160 until rotation of the trim wheel 64 is stopped. Due to the frictional engagement between portion 165 of spring 158 and surface 160, trim wheel 64 remains in its "trimmed status" against the return force exerted by coil spring 168. Once camera 10 is trimmed and the other pre-exposure adjustments have been made, the shutter release button 45 is depressed to initiate a photographic exposure. Subsequent to an exposure the uppermost film unit is moved into rollers 42 and 44. As the film unit passes through rollers 42 and 44 it contacts ramped surface 148 located within notch 151. Further movement of the film unit causes ramped surface 48 to cam outwardly out of notch 151 against the spring force of coil spring 152. The outward camming movement of surface 148 results in a clockwise rotation of levered member 146 and rod 150 about the axis of cylindrical rod 150. The clockwise rotation of rod 150 effects a similar rotation of spring 158. The clockwise rotation of spring 158 causes end 165 to leave surface 160 thereby releasing the frictional engagement between the two elements. Accordingly, trim wheel 64 is allowed to return to its normal position under the force derived from the previously tensioned coil spring 168. As the film unit is finally passed through rollers 42 and 44 and out of the camera 10 the camming engagement between the film unit and surface 148 is removed and the latter is returned to its position within notch 151 by spring 152. Levered member 146 and rod 150 are rotated counterclockwise causing a similar rotation to spring 158. As trim wheel is returned to its normal position, spring end 165 falls within the sloped notch 164 thereby returning the trim mechanism to its normal position.

Figure 6:
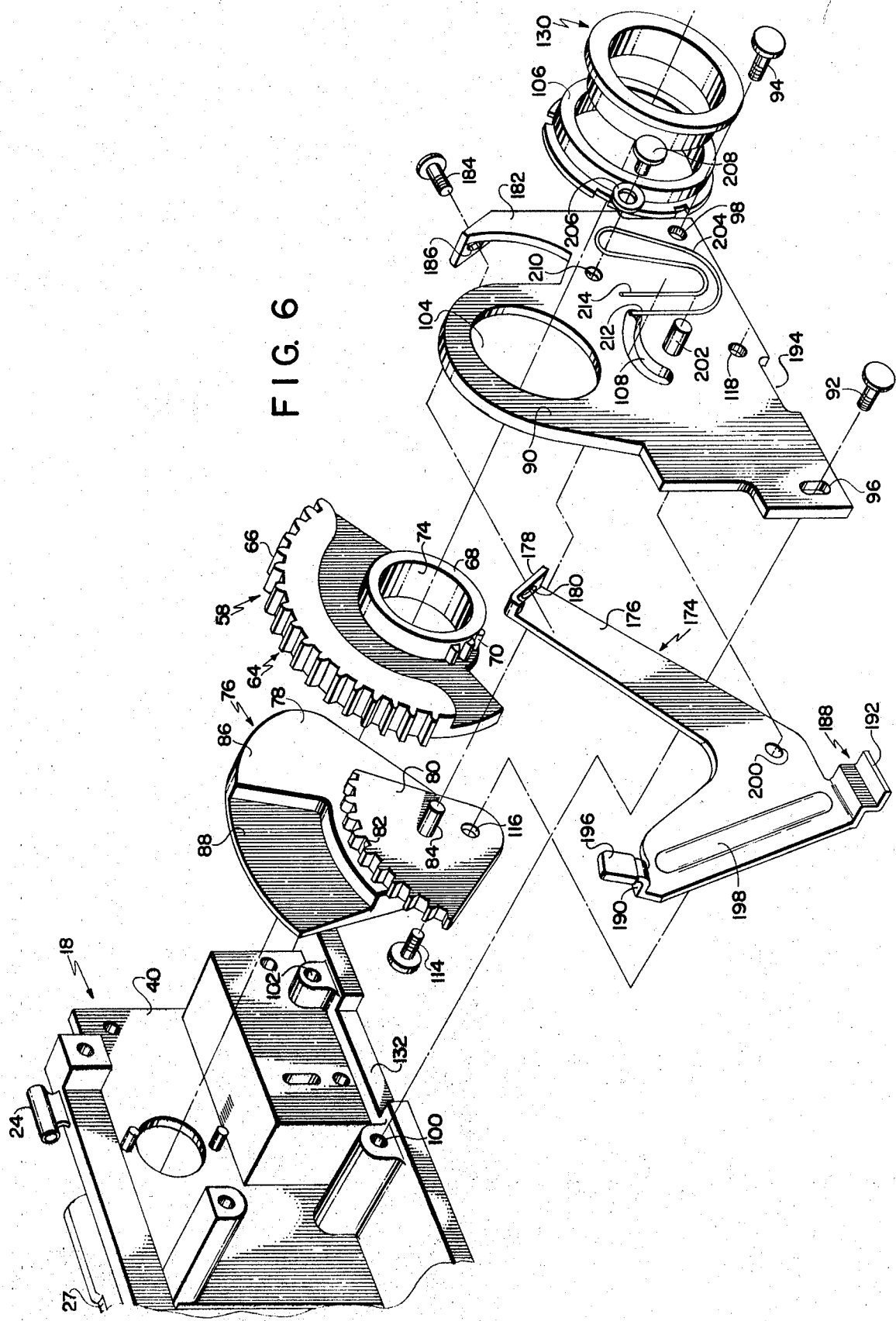
FIG. 6 is an exploded perspective view of a third embodiment of the present invention.

Looking to FIG. 6, there is shown a third embodiment of the present invention. Utilizing features of the first two embodiments, the third embodiment contains elements which function to automatically return the trim mechanism to its normal predetermined position in response to camera folding. As may be apparent, the embodiment shown in FIG. 6 is similar to that shown in FIG. 4. Trim wedge 76, housing 18, and elements 106 and 130 are the same as shown and described in the preferred embodiment. Lens 60 is also part of the new embodiment, but, for purposes of clarity, is not shown.

Located between mounting plate 90 and trim wheel 64 is a spring member 174. Spring 174 is configured having a relatively rigid rib portion 176. A mounting platform 178 is formed at the end of rib 176 with a bore 180 formed therein for mounting spring 174 to plate 90. Spring 174 is fixedly mounted to an extension 182 of plate 90 by a bolt 184 which extends through a bore 186 in extension 182 and through bore 180 of mounting platform 178. The opposite end of spring 174 is configured having two extensions 188 and 190 formed on the lower and upper portions of spring 174, respectively. Lower extension 188 is a generally step-like arrangement, the end 192 of which extends in front of mounting plate 90 through a notch 194 formed therein. End 192 is of sufficient length to extend through both notch 194 and notch 132 and below the lower portion of exposure control housing 18. The tip of upper extension 190 contains a friction pad 196 which is formed of a material such as rubber or the like, having a high coefficient of friction. When trim assembly 58 is assembled, friction pad 196 is engageable with a portion of the rearward side of trim wheel 64. A stiffening rib 198 extends between extensions 190 and 188 for providing a rigid connection between the two. Additionally included on spring 174 is a bore 200 which, when trim assembly 58 is assembled, permits pin 114 to extend through spring 174 and into hole 118 formed in mounting plate 90.

Positioned below arcuate slot 108 on mounting plate 90 is a pin extension 202. Pin 202 is fixedly attached to mounting plate 90 and functions in a manner which will be discussed below. A bifurcated spring 204 is fixedly mounted to plate 90 by a washer 206 and bolt 208 which cooperate with a hole 210 formed in plate 90. As may be evidenced from FIG. 6, spring 204 has two ends 212 and 214 which are located on the left and right side of pin 202, respectively. Pivot 114 extends through hole 116 of wedge 76 and into arcuate slot 108 where it is captured between spring ends 212 and 214. When trim assembly 58 is adjusted to either its lighten or darken position, pin 84 of wedge 76 moves within slot 108. Clockwise movement of pin 84 deflects spring end 214 to the left while end 212 remains in the position shown due to its engagement with pin 202. Likewise, counterclockwise movement of pin 84 causes spring end 212 to deflect to the right while end 214 is retained by its engagement with pin 202.

During the trim adjustment, trim wheel 64 is rotated to effect the rotation of trim wedge 76 discussed above.

In the absence of spring 174, the trim assembly 58 would be returned to its normal position under the influence of one end of reflected spring 204. Accordingly, spring 174 is provided to retain trim assembly 58 in its adjusted position while an exposure is being taken. This is achieved through the engagement of friction pad 196, of spring 174, with the rear of trim wheel 64. Spring extension 190 is biased into contact with trim wheel 64 and will remain in contact until such time as the camera is folded. It should be noted that spring end 212 or 214 remains deflected during the period in which assembly 58 is trimmed.

Figure 7:
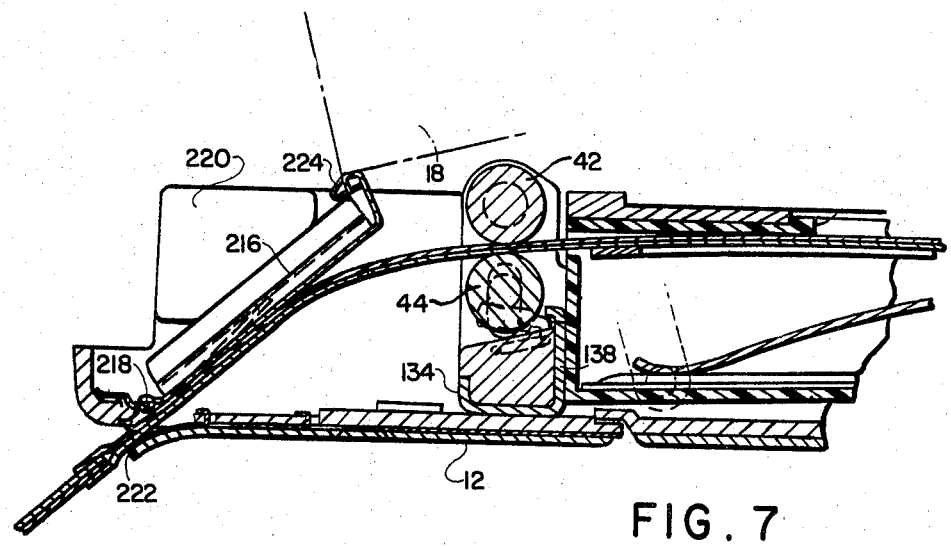
FIG. 7 is a sectional view of additional structure operable with regard to the embodiment shown in FIG. 6.
Figure 8:
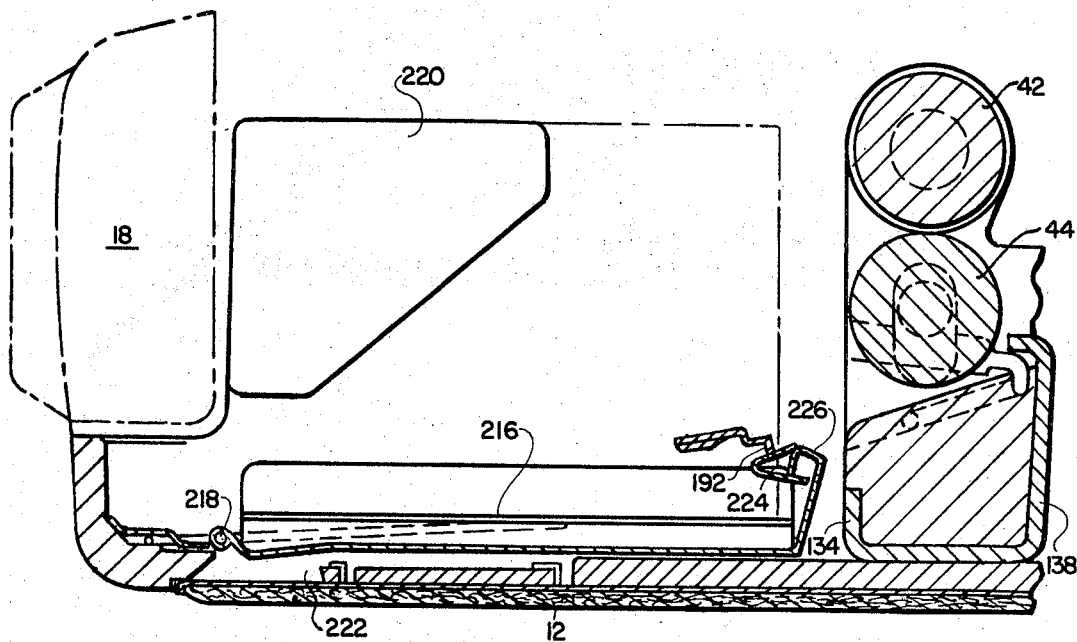
FIG. 8 is a sectional view of the structure of FIG. 7 when the latter is in a folded configuration.

When camera 10 is folded, friction pad 196 is moved out of engagement with the rear of trim wheel 64 and the assembly 58 is returned to its predetermined position through the forces exerted by deflected spring end 212 or 214. As discussed previously, exposure control housing 18 is folded into a configuration best shown in FIG. 2. As housing 18 is moved into its folded configuration, end 192 of extension 188 is pivoted into contact with a baffle member 216 proximate lower portion 134 of support bracket 138. Although the angle of incidence between end 192 and portion 134 varies during the folding operation, it may be assumed to be 45 degrees. Baffle member 216 is shown and described in a copending application for United States Patent entitled "Self-developing Camera System," by Richard R. Wareham and Richard Paglia, Ser. No. 246,703 filed simultaneously herewith and assigned to the assignee of the present application. It should be noted that baffle member 216 is the invention of Richard R. Wareham, et al. and is not the invention of the present applicant. Looking to FIGS. 7 and 8, baffle member 216 is pivotally mounted on a forward portion of bottom housing section 12 by a pivot rod 218. A spring (not shown) is connected between baffle member 216 and its pivot for automatically erecting member 216 when camera 10 is erected (see FIG. 7). A stop 220 is provided on housing 12 for limiting the baffle 216 at its upper limit. When erected, baffle member 216 provides a light shield or shade for the exiting film unit. As may be evidenced from FIG. 7, the film unit exits from camera 10 through an exit slot 222 provided at the forwardmost portion of bottom housing 12. Due to the specific configuration of the film unit, shading is necessary in order to prevent actinic light from "piping" through the film unit and clouding that portion of the film unit which has not yet passed through rollers 42 and 44 (see FIG. 7). When camera 10 is folded, exposure control housing 18 is operative to engage baffle member 216 and return it to its folded position as shown in FIG. 8.

A bump 224 is provided at the rearwardmost portion 226 of baffle member 216 for engaging the end portion 192 of extension 188. Bump 224 is located on only a select segment of portion 226 adjacent end portion 192 and does not extend across the full width of portion 226. Bump 224 may be formed by turning over and crimping a portion of baffle 216 as may be evidenced from FIG. 8. As may be seen from this Figure, end portion 192 contacts bump 224 when the housing sections are collapsed. When folded, baffle 216 is parallel with bottom housing 12 and bump 224 extends into the path of end extension 192. It is the engagement between end extension 192 and bump 224 that actuates the return mechanism described above.

Due to the relatively high rigidity of spring 174, as a result of stiffening rib 198, a force acting on end 192 at an angle of 45 degrees will move extension 190 and pad 196 out of engagement with the rearward side of trim wheel 64. Specifically, extensions 188 and 190 are twisted out of their static positions thereby resulting in a torsional stress through irb 176. Due to a relatively large moment arm between extensions 188 and 190 and mounted plate 178, a force applied to end 192 will twist spring 174 and disengage pad 196 from wheel 64.

As pad 196 disengages from wheel 64, the frictional engagement for retaining wheel 64 is removed and the deflected spring end 212 or 214 is operative to return pin 84 into its predetermined position within slot 108. The pivotal return movement of pin 84 causes the rotation of wedge 76 and trim wheel 64 to their predetermined positions. The trim assembly has then been returned to its predetermined normal position.

When the camera 10 is again erected, the force upon end 192 of spring 174 is removed. Pad 196 is again returned to its frictional engagement with wheel 64 for retaining the latter in an adjusted position.

Although only a few embodiments have been described, it should become apparent that the scope of the present invention encompasses a variety of ways in which a trim mechanism may be automatically returned to a predetermined position after some predetermined camera operation. For instance, a return mechanism may be provided which is operative as a function of camera shutter actuation, i.e., each shutter actuation results in a return of the trim mechanism to its predetermined position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing photosensitive material, said apparatus comprising:
   housing means;
   control means, disposed within said housing means, for regulating the exposure of said photosensitive material, said control means including manually adjustable trim means movable from a predetermined position for selectively varying the degree of regulation of said control means;
   trim reset means coupled in mutually driven relationship with said manually adjustable trim means for automatically returning said manually adjustable trim means to said predetermined position in direct response to movement of said photosensitive material in said photographic apparatus.

2. Photographic apparatus for exposing photosensitive material, said apparatus comprising:
   housing means;
   control means, disposed within said housing means, for regulating the exposure of said photosensitive material, said control means including manually adjustable trim means movable from a predetermined position for selectively varying the degree of regulation of said control means;
   trim reset means positioned in the path of movement of said photosensitive material, said trim reset means being coupled in mutually driven relationship with said manually adjustable trim means for automatically returning said manually adjustable trim means to said predetermined position in response to the movement of said photosensitive material in said photographic apparatus.

3. Photographic apparatus for exposing photosensitive material, said apparatus comprising:
housing means, including means defining an exit aperture through which said photosensitive material is removed from said photographic apparatus subsequent to the exposure of said photosensitive material;
switch means actuable for initiating a photographic exposure of said photosensitive material;
control means, disposed within said housing means, for regulating the exposure of said photosensitive material, said control means including manually adjustable trim means movable from a predetermined position for selectively varying the regulation of said control means;
means responsive to the actuation of said switch means for moving said photosensitive material in said camera toward said exit aperture and, for returning said adjustable trim means to its said predetermined position.

4. Photographic apparatus for exposing photosensitive material, said apparatus comprising:
housing means;
control means, disposed within said housing means, for regulating the exposure of said photosensitive material, said control means including manually adjustable trim means movable from a predetermined position for selectively varying the degree of regulation of said control means; and
trim reset means coupled in mutually driven relationship with said manually adjustable trim means for automatically returning said trim means to said predetermined position subsequent to a predetermined operation of said photographic apparatus, said trim reset means including:
spring means for biasing said adjustable trim means into its said predetermined position when said adjustable trim means is moved from its said predetermined position for selectively varying the degree of regulation of said control means;
second spring means, a portion of which is in selective frictional engagement with a portion of said adjustable trim means, said frictional engagement being operative to retain said adjustable trim means in its adjusted position against the bias imposed by said spring means; and
means actuable subsequent to a predetermined operation of said photographic apparatus for disengaging said frictional engagement between said second spring means and said portion of said adjustable trim means, whereby said adjustable trim means is returned into its said predetermined position under said bias of said spring means.

5. Photographic apparatus for exposing photosensitive material, said apparatus comprising:
housing means including housing members interconnected for movement between an erected configuration for forming an exposure chamber, and a folded configuration:
control means, disposed within said housing means, for regulating the exposure of said photosensitive material, said control means including manually adjustable trim means movable from a predetermined position for selectively varying the degree of regulation of said control means; and trim reset means for automatically returning said manually adjustable trim means to said predetermine position in response to a folding movement of said housing means.

6. The photographic apparatus of claim 5 in which said housing members include one housing member and an exposure control housing member movable with respect thereto to establish said folded configuration; and
said trim reset means is configured and arranged within said exposure control housing member to be driveably contactable with said one housing member when said exposure control housing member is moved to establish said folded configuration.

7. The photographic apparatus of claim 6 in which said trim reset means includes means projectable through a portion of said exposure control housing member.

8. The photographic apparatus of claim 7 in which said projectable means is contactable in driven relationship with a portion of said one housing member when said exposure control housing member is moved to establish said folded configuration.

9. The photographic apparatus according to claim 13 in which said trim reset means includes:
spring means for biasing said adjustable trim means into its said predetermined position when said adjustable trim means is moved from its said predetermined position for selectively varying the degree of regulation of said control means;
said spring means, a portion of which is in selective frictional engagement with a portion of said adjustable trim means, said frictional engagement being operative to retain said adjustable trim means in its adjusted position against the bias imposed by said spring means; and
means actuable subsequent to a predetermined operation of said photographic apparatus for disengaging said frictional engagement between said second spring means and said portion of said adjustable trim means, whereby said adjustable trim means is returned into its said predetermined position under said bias of said spring means.

10. The photographic apparatus according to claim 9 in which said projectable means is integral with said second spring means, said portion of said second spring means being in selective frictional engagement with said portion of said adjustable trim means and movable out of said frictional engagement with said portion of said adjustable trim means when said projectable means is contacted by a portion of one said housing member when said exposure control housing member is moved to establish said folded configuration.

11. The photographic apparatus according to claim 10 in which said movement of said portion of said second spring means out of said frictional engagement with said adjustable trim means is operative to release said portion of said adjustable trim means for movement into its said predetermined position under the bias imparted thereto by said spring means.

12. The photographic apparatus according to claim 11 in which said spring means is formed as a unitary member biadirectionally operative in response to movements of said adjustable trim means.

13. The photographic apparatus according to claim 12 in which said portion of one said housing member contractable with said projectable means is formed as a baffle means.

14. The photographic apparatus according to claim 13 in which said pivotally foldable baffle means is pivotally erectable to an erected position, when said housing members are in said erected configuration, and pivotally foldable to a folded position, when said housing members are in said folded configuration, said baffle means being configured having a select portion thereon engageable with said projectable means when said baffle means is in its said folded position and said housing members are in said folded configuration.

15. The photographic apparatus according to claim 14 in which said select portion of said baffle means engageable with said projectable means is formed as a raised bump, said bump being contractable with said projectable means, said contact between said bump and said projectable means being operative to release said adjustable trim means for movement into its said predetermined position.

16. Photographic apparatus for exposing photosensitive material, said apparatus comprising:
housing means including one housing member and an exposure control housing member interconnected for movement between an erected configuration for forming an exposure chamber, and a folded configuration;
control means, disposed within said housing means, for regulating the exposure of said photosensitive material, said control means including manually adjustable trim means movable from a predetermined position for selectively varying the degree of regulation of said control means; and
trim reset means for automatically returning said trim means to said predetermined position subsequent to a predetermined operation of said photographic apparatus, said trim reset means being configured and arranged within said exposure control housing to be driveably contactable with said one housing member when said exposure control housing member is moved to establish said folded configuration.

17. The photographic apparatus according to claim 16 in which said trim reset means is coupled in mutually driven relationship with said manually adjustable trim means.

18. The photographic apparatus of claim 17 in which said trim reset means includes means projectable through a portion of said exposure control housing member when said trim reset means is moved in correspondence with said manually adjustable trim means movement from said predetermined position.

19. The photographic apparatus of claim 18 in which said projectable means is contactable in driven relationship with said one housing member when said exposure control housing member is moved to establish said folded configuration.

20. The photographic apparatus of claim 19 in which said projectable means is pivotally mounted within said exposure control housing and driveable from said one housing member when said exposure control housing member is moved towards said one housing member to establish said folded configuration.

21. The photographic apparatus to claim 19 in which: said manually adjustable trim means includes a trim wheel pivotally mounted within said exposure control housing member, having a manually contactable first radial periphery and a second drive periphery pivotal in correspondence therewith;
a trim component movable in correspondence with said second periphery for selectively affecting the responsiveness of said control means; and
said trim reset means is associated in mutually driven relationship with said trim wheel at said second periphery and with said trim component.

22. The photographic apparatus of claim 21 wherein said trim component is mounted for pivotal movement with said exposure control housing member and is driveably connected with said trim wheel second periphery and with said trim reset means.

23. The photographic apparatus of claim 22 in which said trim reset means is pivotally mounted within said exposure control housing member and is driveably linked with said trim component.

24. Photographic apparatus for exposing photosensitive material, said apparatus comprising:
means defining housing members interconnected for movement between an erected configuration for forming an exposure chamber, and a folded configuration;
control means, disposed within at least one of said housing members, for regulating the exposure of said photosensitive material, said control means including manually adjustable trim means movable from a predetermined position for selectively varying the degree of regulation of said control means; and
trim reset means for returning said trim means to said predetermined position in response to the movement of said housing members between one configuration and the other configuration.

25. The photographic apparatus of claim 24 in which said trim reset means is coupled in mutually driven relationship with said manually adjustable trim means.

26. The photographic apparatus of claim 24 in which said means defining housing members includes one housing member and an exposure control housing member movable with respect thereto to establish said folded configuration; and
said trim reset means is configured and arranged within said exposure control housing member to be driveably contactable with said one housing member when said exposure control housing member is moved to establish said folded configuration.

27. The photographic apparatus of claim 26 in which said trim reset means is coupled in mutually driven relationship with said manually adjustable trim means.

28. The photographic apparatus of claim 27 in which said trim reset means includes means projectable through a portion of said exposure control housing member when said trim reset means is moved in correspondence with said manually adjustable trim means movement from said predetermined position.

29. The photographic apparatus of claim 28 in which said projectable means is pivotally mounted within said exposure control housing and driveable from said one housing member when said exposure control housing member is moved towards said one housing member to establish said folded configuration.

30. The photographic apparatus of claim 28 in which said projectable means is contactable in driven relationship with said one housing member when said exposure control housing member is moved to establish said folded configuration.

31. The photographic apparatus of claim 30 in which:
said manually adjustable trim means includes a trim wheel pivotally mounted within said exposure control housing member, having a manually contractable first radial periphery and a second drive periphery pivotal in correspondence therewith; and including
a trim component movable in correspondence with said second periphery for selectively affecting the responsiveness of said control means;
said trim reset means being associated in mutually driven relationship with said trim wheel at said second periphery and with said trim component.

32. The photographic apparatus of claim 31 wherein said trim component is mounted for pivotal movement within said exposure control housing member and is driveably connected with said trim wheel second periphery and with said trim reset means.

33. The photographic apparatus of claim 32 in which said trim reset means is pivotally mounted within said exposure control housing member, and is drieably linked with said trim component.

34. Photographic apparatus for exposing photosensitive material and subsequently, for providing the exiting of said photosensitive material out of said camera, said apparatus comprising:
housing means;
control means, disposed within said housing means, for regulating the exposure of said photosensitive material, said control means including manually adjustable trim means movable from a predetermined position for selectively varying the degree of regulation of said control means;
trim reset means coupled in mutually driven relationship with said manually adjustable trim means for automatically returning said manually adjustable trim means to said predetermined position in response to the movement of said photosensitive material in said photographic apparatus, said trim reset means including spring means for biasing said adjustable trim means into its said predetermined position when said adjustable trim means is moved from its said predetermined position for selectively varying the degree of regulation of said control means;
second spring means, a portion of which is in selective frictional engagement with a portion of said adjustable trim means, said frictional engagement being operative to retain said adjustable trim means in its adjusted position against the bias imposed by said spring means; and
means actuable subsequent to a predetermined operation of said photographic apparatus for disengaging said frictional engagement between said second spring means and said portion of said adjustable trim means, whereby said adjustable trim means is returned into its said predetermined position under said bias of said spring means.

35. The photographic apparatus according to claim 34 in which:
said means actuable for disengaging said frictional engagement is formed as a lever means, a portion of which is selectively interposed within the exit path of said photosensitive material from said photographic apparatus;
said portion of said adjustable trim means is formed as a cam means integrally formed as a part of said manually adjustable trim means, said cam means being movable in response to the adjustment of said adjustable trim means; and
said second spring means is formed as a leaf spring, engageable with said cam means, for providing a frictional force between said cam means and said second spring means for retaining said adjustable trim means at its adjusted position.

36. The photographic apparatus according to claim 35 in which said trim reset means further includes means for rotatably connecting said lever means to said second spring means.

37. The photographic apparatus according to claim 36 in which said lever means is rotatably mounted with said connecting means, said lever means being rotatable in response to the exiting of said photosensitive material from said photographic apparatus.

38. The photographic apparatus according to claim 37 in which said rotation of said lever means causes rotation of said second spring means, said rotation of said second spring means being operative to disengage said frictional engagement between said cam means and said second spring means, whereby said trim means is returned to its said predetermined position through the return bias imparted thereto by said spring means.

* * * * *